J. CASE.
Seed-Planter.
No. 12,231.
Patented Jan. 16, 1855.
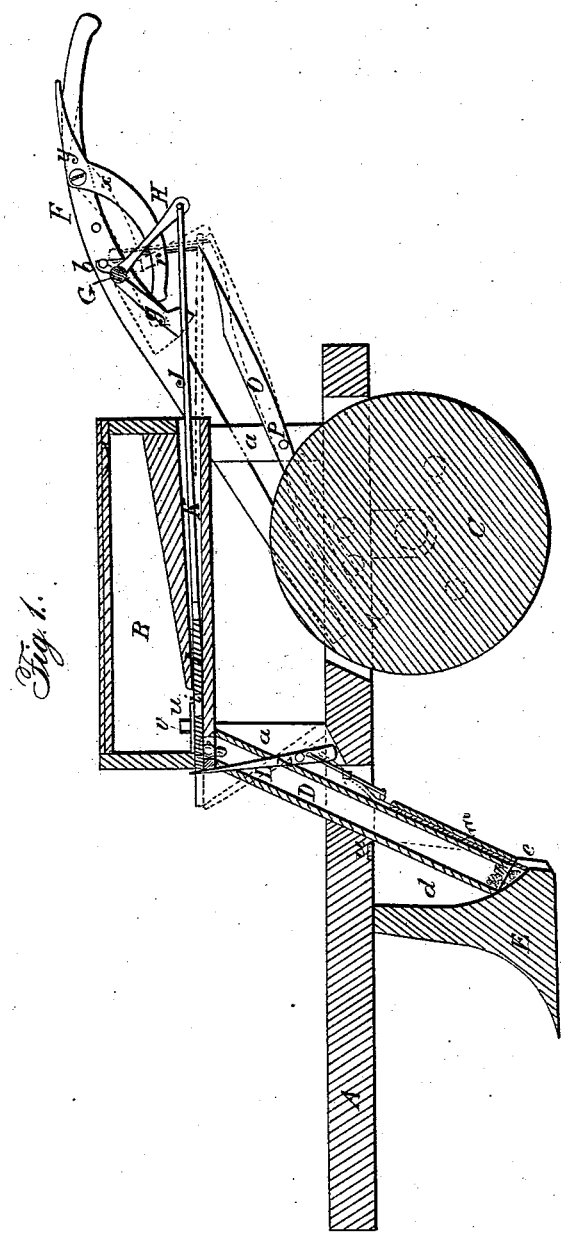
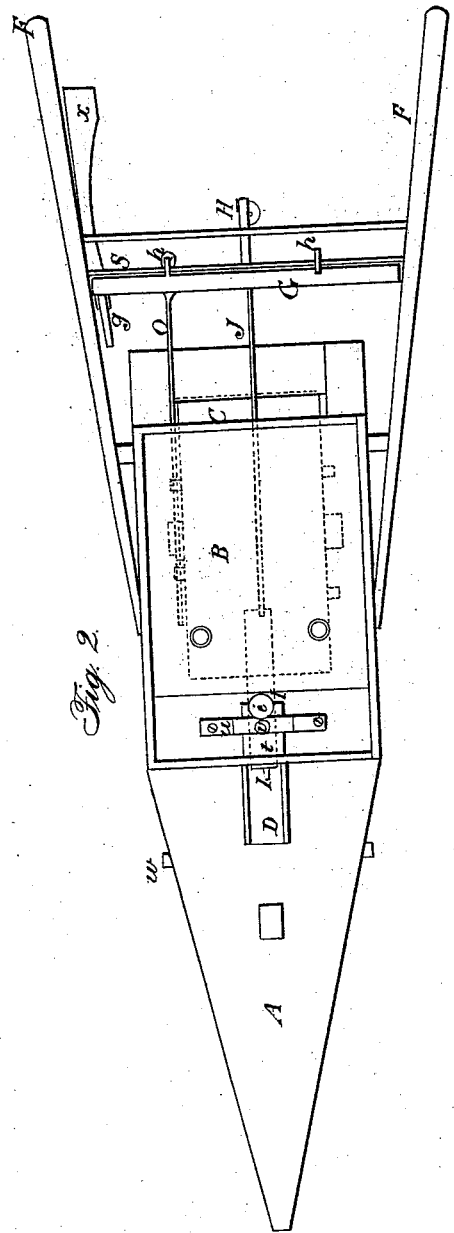

UNITED STATES PATENT OFFICE.

JARVIS CASE, OF SPRINGFIELD, OHIO.

IMPROVEMENT IN SEED-PLANTERS.

Specification forming part of Letters Patent No. 12,231, dated January 16, 1855.

*To all whom it may concern:*

Be it known that I, JARVIS CASE, of Springfield, in the county of Clarke and State of Ohio, have invented an Improvement in Corn-Planters; and I do hereby declare that the following is a full, clear, and exact description of the construction and operation of the same, reference being had to the annexed drawings, making a part of this specification, in which—

Figure 1 is a longitudinal vertical section, the plane of section being through the center. Fig. 2 is a plan or top view of same.

Similar letters of reference indicate corresponding parts in the two figures.

The nature of my invention consists in constructing a new and useful improvement in corn-planters, as follows: first, the manner in which I construct and arrange the rocker, arms *h h* and H, weighted lever, thumb-lever, and the elastic wire for a vibratory motion, for the purpose of dropping an accurate number of grains every time alike; second, in the construction and arrangement of the angular cut-off plate and brush, acting in combination with each other, for the purpose hereinafter set forth.

To enable others skilled in the art to make and use my invention, I will proceed to describe its construction and operation.

A is the beam of the machine.

B is the hopper, which is supported above the beam A by uprights *a a*.

C is the ground-wheel, which is attached to beam A, as shown in dotted lines, Fig. 1.

D is the conveyer-spout.

E is the plow, which is formed with a hollow or open space, *d*, in the back part. The object of said hollow is to receive the lower end of the conveyer-spout. Said plow is also provided with wings or projections *e e*, (there being but one shown in Fig. 1,) which extend back a sufficient distance to prevent the soil from filling the furrow behind the plow before the grain has dropped to the bottom of the furrow.

F F are the handles.

G is the rocker, which has its bearings in the handles F F. Said rocker is provided with a weighted lever, *g*. It is also provided with arms *h h* and H.

X is the thumb-lever, which has its fulcrum at *y*, and is operated by the thumb while planting in check-rows.

I is the reciprocating slide, which is provided with an aperture, *i*, and is connected to arm H by means of connecting-rod J, and slides in suitable ways, K, Fig. 1.

L is a lever which has its fulcrum at *l*, and is connected to slide *m* by means of connecting-rod *o*.

O is a lever which has its fulcrum at P, one end of which is connected to arm *h* by means of rod *r*. The other end passes down close by the side of the wheel C, as seen in dotted lines, Fig. 2.

S is an elastic wire, which passes under arms *h h*, and has its ends firmly fixed in handles F F.

*t* is the cut-off plate, which is made of leather or its equivalent, it being impossible to construct a cut-off plate in the form shown in Fig. 2 of wood or metal that will produce the desired effect, from the fact that the grains of corn often project a little above the top of the slide I at the time that the aperture *i* is passing under the cut-off plate *t*. Therefore, if said cut-off plates were made of any inelastic substance, the grains of corn would either be crushed or the motion of the slide would be arrested. The use of leather or its equivalent for the construction of the cut-off plates entirely obviates this difficulty by its elastic qualities, which allow it to rise and let the corn pass under it without being crushed or injured.

*u* is a brush-stock, which is secured at each end by means of screws, as seen in Fig. 2. Said brush-stock is hollowed out on the under side, as seen in Fig. 1.

V is the brush, which is composed of bristles or any other suitable material, and passes through the brush-stock, and projects down or nearly down to the cut-off plate and directly over the angle in said plate, as seen in the drawings. The object of said brush is to aid the cut-off plate by brushing all superfluous grains from aperture *i* before said cam comes in contact with the cut-off plate. It will also be seen that the grains of corn lying partially within and partially above the aperture, on being carried forward in contact with the brush, are pressed snugly into the aperture, or at least as many of them as said aperture will contain, thus causing an equal number of grains, or nearly so, to be discharged at each operation.

W is a bar of iron passing across the under side of the beam, and is secured firmly to it.

The ends of said bar project out on either side of the beam, and are bent downward and serve as sights for checking. This bar, for convenience, I call the "indicator." This bar also serves to prevent the beam from splitting, likewise to prevent the wings of the plow from wearing or pressing into the beam.

Operation: Mark your ground one way, as desired; the machine marks, drops, and covers the other way. Give a quick downward motion on the lever, relieving it instantly for its self backward motion. This places a hill on the lower slide, $m$. Then moving forward and giving the same motion to the lever every time the indicator comes to the furrow, the corn drops from the lower slide, $m$, the instant you operate the lever, the discharge from the hopper falling through the spout while the machine moves between the furrows. The indicator, being from three to four feet forward of the operator, allows him to watch it, also to keep a proper distance from the row previously planted, so that the operator can do his dropping and driving with perfect ease. The self backward motion of the slide I, when left unencumbered by the thumb of the operator, has a vibratory motion. The vibratory motion is obtained by the wire passing through the handles close to and between arms $h\ h$ and H in such a manner that when I bear down on the thumb-lever the weighted lever turns the rocker back and arms $h\ h$ press down on the elastic wire, so that when the thumb-lever is relieved the wire and the weight of the weighted lever throw the rocker forward, and arm H presses upward on the wire and again throws the rocker back, and so on, which causes the vibratory motion. The advantages of agitating the slide are obvious, as an aperture passing through under the corn (of different shapes and sizes) with a regular motion agitating the corn above the aperture could not fill as readily as with a quick backward and forward motion of the aperture as it agitates the corn in the aperture as well as above the aperture. The weighted lever $g$ is connected to the rocker, projecting forward sufficiently to give the desired result when the thumb-lever is pressed down by the operator. The weighted lever, which is attached to rocker G, is raised up while the wire is pressed down, being relieved suddenly. Both operating at the same time gives a vibratory motion to slide I. This is scarcely perceivable in the model; but in a working machine it vibrates nearly all the time the machine is passing between the furrows. The quantity of grain to pass from the hopper can be regulated by changing slides I with larger or smaller apertures in them, also by the number of pins in the side of wheel C. This machine, when drilling, leaves the grain in almost any position the operator may desire. If you wish your corn in hills, attach lever O to arm $h$. Let the lower slide work as when checking. If you wish it drilled or scattered along in the furrow, raise the lower slide by placing the lever forward out of reach of slide I, and fasten it there in any convenient manner. This leaves the grain to pass through the spout unobstructed, as in other drills.

The cut-off plate $t$ was the most difficult point in the machine to bring to perfection, although simple when discovered, the motion of the slide forward and back being almost simultaneous, it is found by experiment. Merely passing the aperture $i$, even twice its size, in the opening will not discharge all the grain before the backward motion. If not discharged every time, there would not an even number of grains fall. This would not do for the farmer, as the machine must do the work as perfect as by hand-dropping. This I have accomplished by placing an angular cut-off plate over the opening in the hopper to the spouts, this opening being some two inches long the plate capping all except what the brush caps. This allows the aperture in slide I to pass the brush one inch and a half. This gives the grain time to discharge, the brush giving strict measure with the assistance of the angular plate of leather, the vibratory motion of the slide I always filling the aperture.

What I claim, and desire to secure by Letters Patent of the United States, is—

1. The agitation of the seed-slide I by means of rocker G, wire S, and levers $g$ and X, for the purpose of filling the seed-hole with a uniform amount of seed, as set forth.

2. The elastic cut-off plate $t$, in combination with brush $v$, arranged and constructed in the manner and for the purpose herein described.

JARVIS CASE. [L. S.]

Witnesses:
    ALONZO BROOKS,
    O. C. WILLSON.